United States Patent [19]

Aulich et al.

[11] 4,141,710
[45] Feb. 27, 1979

[54] METHOD FOR PRODUCING LIGHT CONDUCTING FIBERS

[75] Inventors: Hubert Aulich, Munich; Hans Pink, Starnberg; Josef Grabmaier, Kempfenhausen, all of Fed. Rep. of Germany

[73] Assignee: Siemens Aktiengesellschaft, Berlin & Munich, Fed. Rep. of Germany

[21] Appl. No.: 815,911

[22] Filed: Jul. 15, 1977

[30] Foreign Application Priority Data

Aug. 23, 1976 [DE] Fed. Rep. of Germany ....... 2637937

[51] Int. Cl.² ............................................. C03C 25/02
[52] U.S. Cl. ............................. 65/3 A; 65/DIG. 7; 65/60 D; 425/165
[58] Field of Search ................ 65/3 A, DIG. 7, 60 D; 427/165, 168, 169

[56] References Cited

U.S. PATENT DOCUMENTS

3,865,564  2/1975  Jaeger et al. .............................. 65/2

FOREIGN PATENT DOCUMENTS

| | | | |
|---|---|---|---|
| 2414008 | 10/1974 | Fed. Rep. of Germany | 65/3 A |
| 2434717 | 3/1975 | Fed. Rep. of Germany | 65/3 A |
| 2447353 | 4/1976 | Fed. Rep. of Germany | 65/3 A |
| 2545273 | 4/1977 | Fed. Rep. of Germany | 65/3 A |
| 51-46958 | 4/1976 | Japan | 65/3 A |

OTHER PUBLICATIONS

D. A. Krohn et al., "Strengthening of Glass Fibers: I Cladding", Jour. of the Amer. Ceramic Soc., vol. 52, #12, Dec., 1969, pp. 661-664.

MacChesney et al., "Preparation of Low Loss Optical Fibers Using Simultaneous Vapor Phase Deposition & Fusion", 10th Int. Cong. on Glass, 1974, pp. 6-40 to 6-45.

U. G. Unger, Optical Communications Technique, 1976, Berlin, pp. 38-40.

*Primary Examiner*—Robert L. Lindsay, Jr.
*Attorney, Agent, or Firm*—Hill, Gross, Simpson, Van Santen, Steadman, Chiara & Simpson

[57] ABSTRACT

A method of producing a light conducting fiber comprises the steps of providing a base member of an optical material such as glass or a synthetic glass-like material, depositing at least one optical material forming layer such as a glass forming layer or a synthetic glass-like material forming layer from a liquid phase on a surface of the base member and subsequently transforming each of the layers into a film of optical material such as a glass film or a synthetic glass-like film. The base member may be a glass tube and the optical material forming layers may be deposited on an interior surface and after the layers have been transformed into a film, the tube is collapsed into a rod and then subsequently drawn into a cladded light conducting fiber. In one embodiment of the invention, the base member is a rod and the layers are deposited on a surface of the rod which is subsequently drawn into a cladded light conducting fiber. In yet another embodiment of the invention, the base member is provided by drawing a core of an optical fiber and the method includes depositing the optical material forming layers on the core so that as the layers are transformed into the film of optical material, a cladded light conducting fiber will be produced.

9 Claims, 2 Drawing Figures

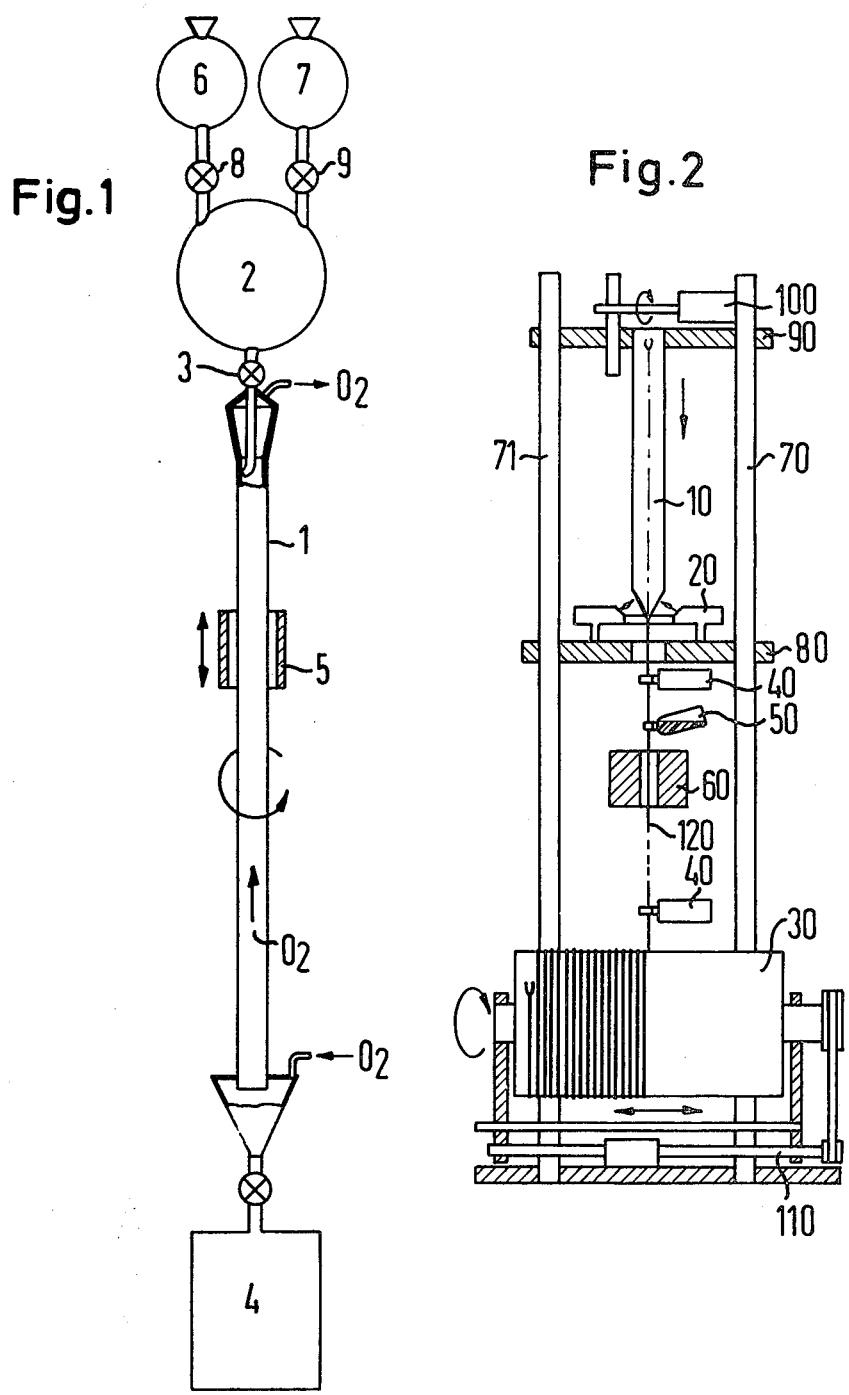

METHOD FOR PRODUCING LIGHT CONDUCTING FIBERS

BACKGROUND OF THE INVENTION

1. Field of the Invention

The present invention is directed to a method of producing light conducting fibers which method includes providing a base member of an optical material, depositing at least one optical material forming layer on a surface of the base member and then subsequently transforming each of the layers into a film of optical material.

2. Prior Art

Thin glass fibers are utilized as transmission medium in optical communication transmission systems. The glass fibers generally consist of a fiber core and cladding composed of materials which have been selected so that the refractive index of the core is higher than the refractive index of the material forming the cladding.

A cladded light conducting fiber with a stepped index profile and a cladded light conducting fiber with a gradient index profile are known. A stepped index profile means that the refractive index abruptly changes its value at the boundary surface of the core and cladding so that the core has a higher refractive index than the cladding. A gradient index profile means that the light conducting fiber has a higher refractive index in the vicinity of the fiber axis and that this refractive index continuously decreases with an increasing distance from the fiber axis. Both types of fibers can have an additional synthetic material casing which is to protect the fiber particularly from mechanical damages. In each type of light conducting fibers, light can be guided or conveyed over very long distances.

The technique of chemical vapor deposition is known for the production of such fibers, for example see the publication by J. B. Mac Chesney, P. B. O'Connor, F. V. DiMarcello, J. R. Simpson, P. D. Lazey, "Preparation of Low Loss Optical Fibers Using Simultaneous Vapor Phase Deposition and Fusion", 10*th International Congress of Glass,* (1974), pages 6–40 to 6–45. To form an optical fiber having a stepped index profile, a double crucible method has been suggested (see H. G. Unger, "Optical Communications Technique", 1976, Berlin, pages 39 and 40).

SUMMARY OF THE INVENTION

The present invention is directed to a method of producing light conducting fibers particularly cladded light conducting fibers with a low attenuation. This task is accomplished by providing a base member of an optical material, depositing at least one optical material forming layer from a liquid phase onto a surface of the base member, and subsequently transforming each of the layers into a film of optical material.

Advantageously, the method of the present invention is inexpensive and has an additional advantage that it can be easily accomplished. The method of the present invention may be used for providing light conducting fibers having either a stepped index profile or gradient index profile.

In the present invention, an optical material is meant to include glass-like synthetic material as well as glass. When the optical material is glass, a glass base member may have glass forming layers deposited thereon and these layers are then subsequently transformed into glass film by means of a thermal decomposition of the layers. When a glass-like synthetic material is used as the optical material, low polymers or monomers are dissolved in a solution medium and are brought to polymerization during the vaporization of the solution medium, for example, by means of increasing the temperature, ultraviolet radiation or gamma radiation.

The base member may be either a tube or rod. When the base member is a glass rod, the depositing proceeds on an external surface thereof and when the base member is a glass tube, the deposition can also proceed on the interior surface of the tube. After applying the desired thickness of the film on the tube, it is collapsed into a rod. The composite rod and film are drawn into a light conducting fiber such as a cladded light conducting fiber.

In addition, the process may be used for applying a cladding directly on a core of a fiber. This is accomplished by drawing a glass fiber core and subsequent to drawing the core, depositing the layer of glass forming material and then transforming the material into a glass cladding.

Thus, light conducting fibers formed of glass or of synthetic materials can be produced with either a stepped index or gradient index profile.

The preferred sample embodiment is described as follows. In one sample embodiment, a liquid phase consisting of water-free solution in which compounds of glass forming oxides of elements selected from a group consisting of Se, Te, P, As, Si, Ge, Sn, Pb, Ti, B, Al, Mg, Ca, Sr, Ba, Li, Na, K and Rb are contained. The glass forming layers are deposited from these solutions and the layers are then transformed into glass films by means of thermal decomposition.

In accordance with the glass composition desired, the solution to be utilized is to contain the desired amount of one of the above mentioned elements and as (a) pure compounds with low monocarboxylic or dicarboxylic acids, wherein the number of carbon atoms in these acids is not to be higher than four; (b) metal halides whose anions are partially substituted by the acid radical selected from a group consisting of monocarboxylic and dicarboxylic acids; or (c) metal halides whose anions are partially substituted by acid radicals selected from a group consisting of monocarboxylic and dicarboxylic acids and additionally partially substituted by radicals selected from a group consisting of hydroxyl, and alcoholate radicals of lower alcohols which have less than four carbon atoms per molecule.

A solution medium for the production of the solutions, which contain the compounds under (a) through (c) as mentioned above, is selected from a group consisting of lower ketones, lower alcohols, esters of lower alcohols with lower carboxylic acids and combinations thereof.

BRIEF DESCRIPTION OF THE DRAWINGS

FIG. 1 schematically illustrates an apparatus for performing the method of the present invention on a hollow or tubular base member; and FIG. 2 illustrates an apparatus for drawing an optical fiber in accordance with the present invention.

DESCRIPTION OF THE PREFERRED EMBODIMENTS

The principles of the present invention are particularly useful for producing a rod of glass-like material, which may be either a glass-like synthetic material or a glass material having a cladding of glass-like material which cladding material is either a synthetic glass-like material or a glass material. The cladded rod formed by the present method may have either a stepped profile or gradual profile for the profile of the index of refraction.

In the apparatus illustrated in FIG. 1, a glass tube 1 is having one or more layers of glass forming material applied on the internal surface with each of the layers being subsequently transformed such as by thermal decomposition into a glass film. To accomplish this, a solution of the glass forming material contained in a supply container 2 is discharged through a dosage valve 3 and projected on an internal wall of the glass tube 1, which is being rotated about its axis as illustrated by the arrow. A thin liquid layer will be formed on the entire internal surface due to the rotating of the glass tube. The thickness of this layer is essentially determined by the rotational velocity of the tube, the wettability of the material forming the layer, and the viscosity of the solution. In order to obtain an even coating of the layer on the internal wall of the tube 1, a solution surplus is fed into the tube and this surplus is collected in a collection container 4. The collected surplus in container 4, if desired, can be re-used.

As soon as a sufficiently thick glass forming layer is desposited on the interior wall of the tube 1, the valve 3 is closed. The thermal decomposition of the layer on the internal wall of the tube proceeds so that a glass film is formed thereon.

Prior to starting the step of thermal decomposition, the tube 1 may be temporarily evacuated in order to vaporize the solvent from the deposited layer. It is also possible to flow oxygen through the tube after the closing of the valve 3 so that the solvent remaining in the layer is thereby oxidized and removed therefrom. This flow of the oxygen is illustrated in FIG. 1 with the arrows which are reference $O_2$.

Whether the solvent was removed by a flow of oxygen or by evacuation; after its removal, the layer is heated by means of an oven 5 so that the thermal decomposition can occur. To accomplish the thermal decomposition, the oven 5 is advanced along the tube as indicated by the arrow in FIG. 1, The advance velocity and the temperature of the oven 5 are selected in such a manner that glassy or vitreous blister-free glass films are formed on the interior wall of the tube by means of the thermal decomposition of the layers.

The coating process described hereinabove can be repeated in multiple operating cycles so that the glass films of arbitrary thickness or multiple glass films composed of various individual glass films can be produced.

If glass films of multiple component glass are to be produced, individual containers such as 6 and 7 are provided (note only two containers are illustrated). Each of these containers will accommodate a solution for an individual glass component. These solutions are guided to the supply container 2 by dosage or control valves 8 and 9 and once emitted to the chamber 2 are thoroughly homogenized by stirring, if necessary. Subsequently, multiple components, which have been produced in the container 2, are fed into the glass tube as described hereinabove.

In the case of producing light conducting fibers with parabolic cores of refractive index, various glass forming layers are deposited on the tube 1 in succession and then the layers are thermally decomposed into the glass films. For the formation of each layer, solutions of different compositions are produced in the supply container 2. Accordingly, different amounts of solutions for the individual components are fed into supply container 2 from the containers 6 and 7. It is therefore possible to automatically set the precise concentration of the various components in the solution in the supply container by using a program generator for controlling the actuation of the valves 8 and 9.

As illustrated in FIG. 1, the glass tube is in a vertical arrangement. It is also possible to perform the method on a glass tube which is horizontally positioned. The only requirement is that the tube has a slight inclination so that collection of the surplus solution can occur in a container such as 4.

When the desired thicknesses of the glass layers or film is obtained on the interior wall of the tube, the temperature of the oven 5 is increased until the tube 1 will collapse into a rod. This rod is then subsequently drawn into an optical fiber. This can be done, for example, with the aid of a drawing device such as illustrated in FIG. 2.

A glass rod 10 is vertically inserted in a mounting support 90 in the drawing device or apparatus of FIG. 2. The rod 10 is heated at a lower rod end with the aid, for example, of a ring-shaped burner 20 which is mounted on a support 80 and produces a ring-shaped oxyhydrogen flame. After obtaining the drawing temperature, a thin fiber 120 is drawn out of the rod end and is mounted for winding on a strethcing drum 30. For longer fibers, the glass rod 10 is continually fed in the direction of an arrow toward the support 80. This is accomplished by the mounting support 90 being advanced downwardly on guide rail 70 and 71 by the aid of a motor drive 100. The fiber diameter is determined by the drawing velocity and the feed velocity of the glass rod. Common fiber diameters at present are 80 μm through 150 μm. The diameter of the fiber can be continuously controlled with the aid of an optical thickness gange apparatus 40 and the drawing velocity is approximately one meter per second.

Instead of heating the rod 10 by means of an oxyhydrogen burner 20, a laser beam may be utilized. An example of an arrangement utilizing a laser beam to heat the end of a rod to a drawing temperature is disclosed in U.S. Pat. No. 3,865,564.

In order to protect the drawn fiber from surface corrosions and breakage during handling, it is expedient to coat the fiber with a synthetic material film. To accomplish this, an adhesive agent can be applied in a known fashion during the drawing of the fiber by means of a coating device 50 and a thin synthetic material film is applied to the fiber. This synthetic material film can be hardened with the aid of a drying oven 60.

As illustrated, the drum 30 is continuously displaced along its axis during winding of a fiber so that fresh fibers 120 is drawn precisely in the extension of the longitudinal axis of the rod 10. To accomplish this axial displacement of the drum, a displacement device 110 is provided.

In one sample embodiment, the liquid phase for the coating of a tube 1 is produced as follows: 0.6 mol acetic acid is dissolved in 60 ml acetic ester. This mixture is placed in a round bottom which has a reflux cooler and 0.15 mol $SiCl_4$ is added to the solution. This mixture is heated to the boiling point for approximately 6 hours. After it is cooled, a white crystal compound is deposited from the mixture by using a dry flow of purified inert gas, for example argon or oxygen. After accomplishing the deposition of the white crystal compound, the remaining reaction solution is poured off.

The crystal compound is then dissolved in a mixture of 40 ml $C_2H_5OH$ and 60 ml $CH_3COOC_2H_5$. This solution can be additionally thin for use, for example, with a mixture of $C_2H_5OH$ and $CH_3COOC_2H_5$, with pure $CH_3COOC_2H_5$, with pure $C_2H_5OH$ or with other lower alcohols or esters having not more than 4 carbon atoms per molecule.

This solution is now fed into a supply container 2 to be applied to the interior of the glass tube 1. The layer deposited on the glass tube from this solution after the thermal decomposition forms a highly purified clear $SiO_2$ film or layer. In order to obtain the desired index of refraction for the glass layers being formed, additional solutions can be mixed to this solution. For example, a solution, which contains lead in a compound which is soluble in a liquid phase and will be transformed into lead oxid (PbO) by thermal decomposition. If desired, the amount of this additional solution can be changed so that the index of refraction of each layer being applied to the interior of the tube is changed so that a gradient profile is obtained.

These solutions with variable lead contents are now placed in the containers such as 6 and 7. By means of different mixing proportions of these solutions with the liquid phase in the supply container 2, a prescribed share of the lead oxide (PbO) can be obtained in each glass layer being produced.

The device of FIG. 2 can also be utilized to coat a glass fiber with cladding glass layers or film, for example, a bare fiber can first be drawn from a rod of core glass. In this case, the glass rod 10 (FIG. 2) consists of material provided for the glass fiber core. In the coating device 50, one of the above mentioned solutions is located so that the glass fiber is provided with a layer which can be transformed into a glass film by means of thermal decomposition. This transformation proceeds in a subsequent oven which is to be provided in the fiber drawing apparatus instead of the drying oven 50. Thus, a fiber having a glass cladding layer is obtained at the exit of the oven.

Additional coating devices can be provided behind the oven and viewed in the direction of the fiber drawing. The thickness of the fiber cladding and, of course, the refractive index can be set arbitrarily by repeated coating of the core glass fiber and by a choice of the solutions for the coating. For example, the choice of the refractive index can exhibit a W-profile in which the fiber core has a high refractive index, a first fiber sleeve or cladding has a low refractive index and a second fiber sleeve or cladding again has an increased refractive index which is higher than the first fiber cladding.

With the aid of the method of the present invention, finished core cladded fibers can be coated with glass layers in order to improve their mechanical and chemical properties. For example, if a glass layer, which has a smaller coefficient of thermal expansion in relation to the fiber, is applied to the cladding of these fibers, the fiber composite action under a compressive stress will lead to an increased mechanical tensile strength. This is well known from a publication by D. A. Krohn, A. R. Cooper, *Journal of American Ceramic Society*, 82 (1969), page 661.

In addition, if a glass layer, which has a higher chemical stability, is applied onto a cladded fiber, the resistance ability of the light conducting fiber against atmospheric corrosion can be increased.

Glass films of the highest purity can be produced with the aid of the method of the present invention. Since the attenuation of light in an optical fiber is reduced as the purity of the glass material is increased, light conductive fibers of very low or small attenuation can be advantageously produced by the present method. These fibers are particularly suited for long distance communication transmission.

Although various minor modifications may be suggested by those versed in the art, it should be understood that we wish to embody within the scope of the patent warranted hereon, all such modifications as reasonably and properly come within the scope of our contribution to the art.

We claim:

1. A method for the production of light conducting fibers, said method comprising providing a glass-like base member of optical material, providing a liquid phase consisting of a water-free solution having compounds of glass forming oxides of at least one element selected from a group consisting of Se, Te, P, As, Si, Ge, Sn, Pb, Ti, B, Al, Mg, Ca, Sr, Ba, Li, Na, K and Rb, at least one of said elements being dissolved in an acid selected from a group consisting of monocarboxylic and dicarboxylic acids, each of said carboxylic acids having no more than four carbon atoms, said solution having a solution medium selected from a group consisting of lower keytones, lower alcohols, esters of lower alcohols with lower carboxylic acid and combinations thereof, each of said solution mediums having no more than 4 carbon atoms, depositing at least one layer from the liquid phase onto a surface of the base member, and subsequently transforming each of said layers into a film of optical material by heating the layer to cause thermal decomposition of each layer into a glass film.

2. A method for the production of light conducting fibers, said method comprising providing a glass-like base member of optical material, providing a liquid phase consisting of a water-free solution having compounds of glass forming oxides of at least one element selected from a group consisting of Se, Te, P, As, Si, Ge, Sn, Pb, Ti, B, Al, Mg, Ca, Sr, Ba, Li, Na, K and Rb, said element being in a compound of a metal halide with an anion of the halide being partially substituted by a radical selected from a group of monocarboxylic acid and dicarboxylic acid radicals, said solution having a solution medium selected from a group consisting of lower keytones, lower alcohols, esters of lower alcohols with lower carboxylic acid and combinations thereof, each of said solution mediums having no more than 4 carbon atoms, depositing at least one layer from the liquid phase onto a surface of the base member, and subsequently transforming each of said layers into a film of optical material by heating the layer to cause thermal decomposition of each layer into a glass film.

3. A method according to claim 2, wherein said base member is a tubular glass member and wherein the step of depositing the optical material forming layer comprises depositing the optical material layers on an interior wall surface of the tubular glass member, and which method further includes subsequent to transforming the desired number of layers into glass films, collapsing the tubular member into a rod and then subsequently drawing the rod into a cladded light conductor fiber.

4. A method according to claim 2, wherein the base member comprises a glass rod of optical material and said step of depositing the optical material forming layers comprises depositing the layers on the surface of the rod and that subsequent to obtaining the desired thickness of the optical material, the rod with the attached films of optical material are drawn into a cladded light conducting fiber.

5. A method according to claim 2, wherein the step of providing a base member comprises drawing a glass core of an optical fiber and said step of depositing an optical material forming layer comprises depositing the material onto the drawn glass core so that subsequent to the step of transforming the layers into a glass film of optical material, a cladded light conducting glass fiber is produced.

6. A method according to claim 2, which further includes that anions of the halides are additionally partially substituted by radicals selected from a group of hydroxyl radical, alcoholate radical of lower alcohols and combinations thereof.

7. A method according to claim 1, wherein said base member is a tubular member and wherein the step of depositing the optical material forming layer comprises depositing the optical material layers on an interior wall surface of the tubular member, and which method further includes subsequent to transforming the desired number of layers into film, collapsing the tubular member into a rod and then subsequently drawing the rod into a cladded light conductor fiber.

8. A method according to claim 1, wherein the base member comprises a rod of optical material and said step of depositing the optical material forming layers comprises depositing the layers on the surface of the rod and that subsequent to obtaining the desired thickness of the optical material, the rod with the attached films of optical material are drawn into a cladded light conducting fiber.

9. A method according to claim 1, wherein the step of providing a base member comprises drawing a core of an optical fiber and said step of depositing an optical material forming layer comprises depositing the material onto the drawn core of the optical fiber so that subsequent to the step of transforming the layers into a film of optical material, a cladded light conducting fiber is produced.

* * * * *